(12) United States Patent
Gradea

(10) Patent No.: US 7,614,335 B2
(45) Date of Patent: Nov. 10, 2009

(54) HYDRAULIC SYSTEM WITH VARIABLE STANDBY PRESSURE

(75) Inventor: Tudor Gradea, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 169 days.

(21) Appl. No.: 11/606,179

(22) Filed: Nov. 30, 2006

(65) Prior Publication Data
US 2008/0127642 A1 Jun. 5, 2008

(51) Int. Cl.
F15B 13/04 (2006.01)

(52) U.S. Cl. .......................... 91/444; 60/420

(58) Field of Classification Search ............ 60/420, 60/452, 468; 91/444, 448
See application file for complete search history.

(56) References Cited

U.S. PATENT DOCUMENTS

| | | |
|---|---|---|
| 5,277,027 A | 1/1994 | Aoyagi et al. |
| 5,447,027 A | 9/1995 | Ishikawa et al. |
| 5,575,148 A | 11/1996 | Hirata et al. |
| 5,664,477 A | 9/1997 | Koehler |
| 5,680,760 A * | 10/1997 | Lunzman .................. 60/452 |
| 5,873,244 A | 2/1999 | Cobo et al. |
| 5,927,072 A | 7/1999 | Vannette |
| 5,996,341 A * | 12/1999 | Tohji ....................... 91/444 |

* cited by examiner

Primary Examiner—Michael Leslie
(74) Attorney, Agent, or Firm—Finnegan, Henderson, Farabow, Garrett & Dunner

(57) ABSTRACT

A hydraulic system is disclosed. The hydraulic system includes a source of pressurized fluid, a low pressure source, and a plurality of actuators. The hydraulic system also includes a plurality of valves configured to selectively communicate fluid to and from the plurality of actuators. The hydraulic system further includes a first valve disposed downstream of the plurality of valves. The first valve is configured to communicate fluid from the source of pressurized fluid toward the low pressure source.

11 Claims, 3 Drawing Sheets

HYDRAULIC SYSTEM WITH VARIABLE STANDBY PRESSURE

TECHNICAL FIELD

The present disclosure relates to hydraulic systems and, more particularly, to a hydraulic system with variable standby pressure.

BACKGROUND

Hydraulic systems are often used to control the pressure and flow of pressurized fluid to and from one or more actuators to affect movement of the actuators and implements of a machine to perform tasks. Such hydraulic systems typically include a source of pressurized fluid, a fluid reservoir, and one or more valves selectively communicating one or more chambers of the actuators with the source of pressurized fluid and the fluid reservoir. The source of pressurized fluid is often a variable displacement pump that typically has a minimum displacement necessary to maintain pump lubrication. When the pump operates at the minimum displacement, pressurized fluid is provided downstream of the pump at a predetermined and substantially constant pressure, conventionally referred to as standby pressure. The response time of the hydraulic system, e.g., the time necessary to increase pump displacement and direct pressurized fluid to one or more actuators from standby, is a function of the standby pressure. Control and regulation of the standby pressure to reduce energy loss and increase response time may improve the operation of hydraulic systems.

U.S. Pat. No. 5,680,760 to Lunzman ("the '760 patent) discloses a hydraulic drive system including a pump for delivering fluid under pressure from a reservoir to a plurality of hydraulic actuators via a plurality of closed center type valves. The '760 patent also includes a bypass valve downstream of the pump and configured to selectively communicate fluid from the pump to the reservoir. Specifically, the bypass valve of the '760 patent is fully open when there is little or no usage by the actuators and is moved toward a closed position when one of the plurality of actuators is actuated by one of the plurality of the close center valves. Movement of the bypass valve toward the closed position increases pressure in a supply line interconnecting the pump and the plurality of closed center valves and provides operation of the plurality of closed center valves as if they were open center valves.

Although the bypass valve of the '760 patent may control the pressure of fluid directed from the pump, pressure spikes generated within the system may be communicated to the plurality of closed center valves.

The present disclosure is directed to overcoming one or more of the shortcomings set forth above.

SUMMARY OF THE INVENTION

In one aspect, the present disclosure is directed to a hydraulic system. The hydraulic system includes a source of pressurized fluid, a low pressure source, and a plurality of actuators. The hydraulic system also includes a plurality of valves configured to selectively communicate fluid to and from the plurality of actuators. The hydraulic system further includes a first valve disposed downstream of the plurality of valves. The first valve is configured to communicate fluid from the source of pressurized fluid toward the low pressure source.

In another aspect, the present disclosure is directed to a method of operating a hydraulic system. The method includes directing pressurized fluid from a source toward a plurality of first valves. Each first valve has a housing and a spool reciprocating within the housing defining at least first and second valve positions. The method also includes directing pressurized fluid from each of the plurality of first valves toward at least one second valve when each of the plurality of first valves is in a first valve position. The at least one second valve has a variable flow area controllable from a substantially closed position to a fully opened position. The method also includes directing pressurized fluid from the at least one second valve toward a source of low pressure as a function of the variable flow area. The method further includes directing pressurized fluid from one of the plurality of first valves to an operatively associated actuator when the first valve is in a second valve position and closing the at least one second valve when one of the plurality of first valves is in a second position.

In yet another aspect, the present disclosure is directed to a machine including at least one implement. The machine also includes a source of pressurized fluid configured to supply pressurized fluid to a plurality of first valves in parallel and a source of low pressure. The machine also includes a plurality of actuators disposed downstream of the plurality of first valves and operatively associated with the at least one implement. The plurality of first valves are configured to selectively communicate the source of pressurized fluid and the source of low pressure with the plurality of actuators. The machine further includes at least one second valve disposed downstream of plurality of first valves and configured to selectively communicate pressurized fluid from the source of pressurized fluid toward the source of low pressure.

DETAILED DESCRIPTION

Figure 1:
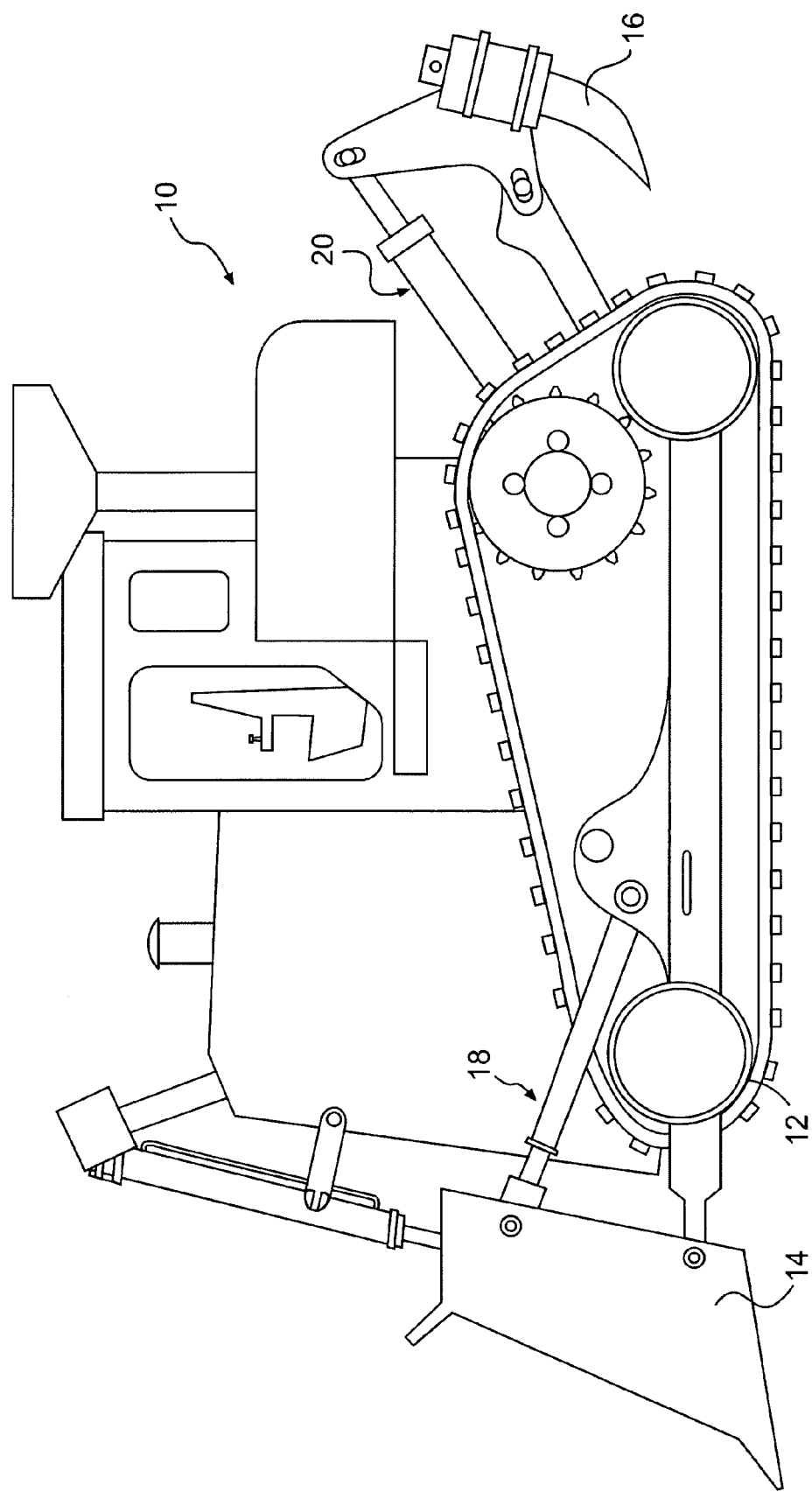
FIG. 1 is a diagrammatic illustration of a exemplary machine in accordance with the present disclosure.

FIG. 1 illustrates an exemplary machine 10. Machine 10 may be a fixed or mobile machine that performs some type of operation associated with an industry such as mining, construction, farming, or any other industry known in the art. For example, machine 10 may be an earth moving machine such as a dozer, a loader, a backhoe, an excavator, a motor grader, a dump truck, or any other earth moving machine. Machine 10 may also include a generator set, a pump, a marine vessel, or any other suitable operation-performing work machine. Machine 10 may include a frame 12, one or more implements 14, 16, and one or more actuators 18, 20 connecting implements 14, 16 to frame 12. It is contemplated that machine 10 may include any number of actuators.

Frame 12 may include any structural unit that supports movement of machine 10. Frame 12 may be, for example, a stationary base frame connecting a power source (not shown) to a traction device (not referenced), a movable frame member of a linkage system, or any other type of frame known in the art.

Implements 14, 16 may include any device used in the performance of a task. For example, implements 14, 16 may include a blade, a bucket, a shovel, a ripper, a dump bed, a propelling device, or any other task-performing device known in the art. Implements 14, 16 may be connected to frame 12 via a linkage system with actuators 18, 20 forming a member in the linkage system, or in any other appropriate manner. Implements 14, 16 may be configured to pivot, rotate, slide, swing, or move relative to frame 12 in any other manner known in the art.

Figure 2:
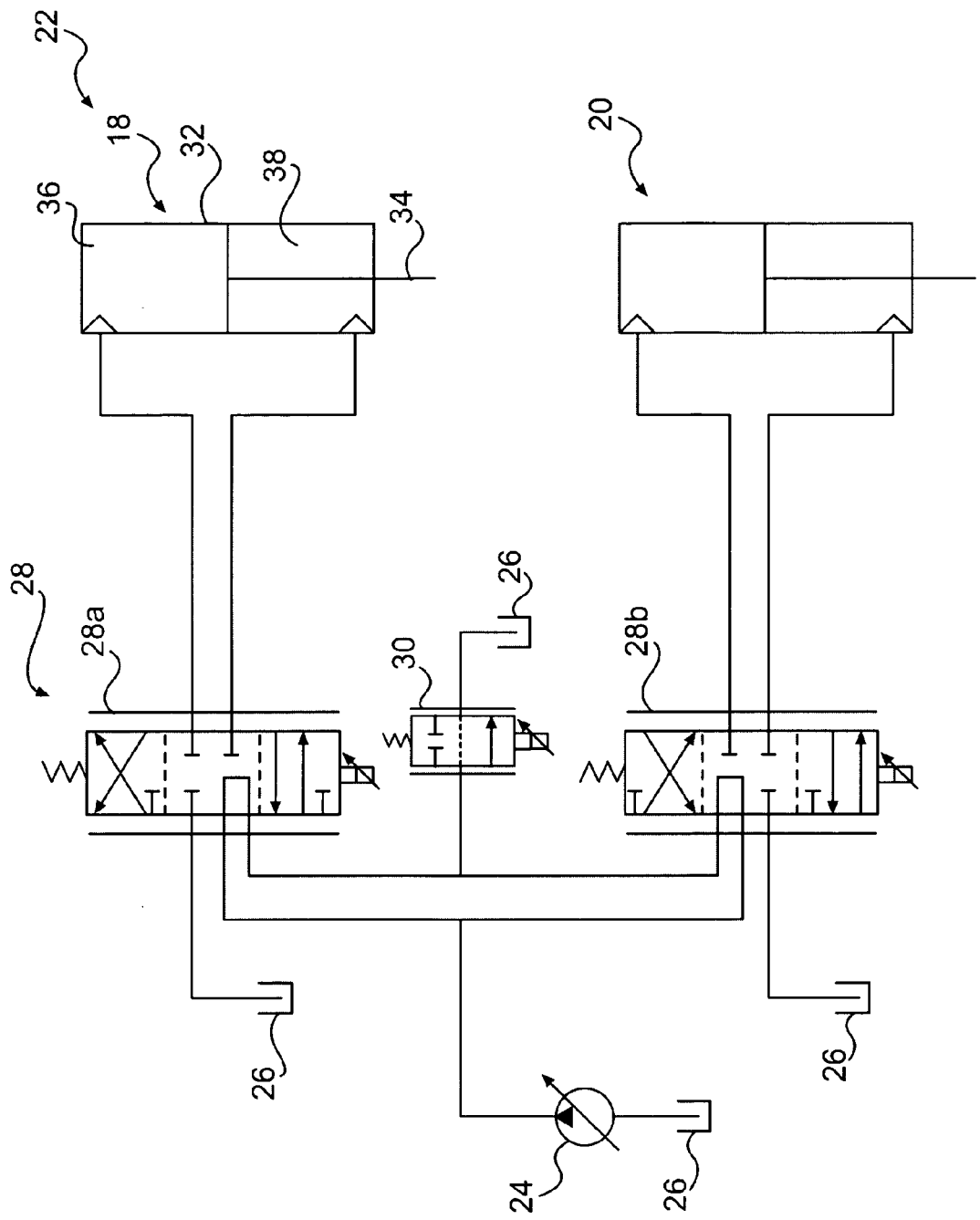
FIG. 2 is a schematic illustration of an exemplary hydraulic system of the machine of FIG. 1.

As illustrated in FIG. 2, actuators 18, 20 may be a plurality of various components within a hydraulic system 22 that cooperate to move implements 14, 16. Hydraulic system 22 may further include a source 24 of pressurized fluid, a low pressure source 26, a plurality of directional valves 28, and a pressure valve 30. It is contemplated that hydraulic system 22 may include a plurality of fluid passages fluidly communicating one or more components with one another as is conventional in the art. It is also contemplated that hydraulic system 22 may include additional and/or different components such as, for example, temperature sensors, position sensors, relief valves, accumulators, pressure regulators, check valves, and/ or other components known in the art.

Actuator 18 may include any hydraulic actuator having a plurality of chambers therein for selectively receiving pressurized fluid. For example, actuator 18 may include a piston-cylinder arrangement having a cylinder 32 and a piston 34 separating the cylinder 32 into a first chamber 36 and a second chamber 38. Piston 34 may be movable in a first direction in response to pressurized fluid supplied to first chamber 36 and may be movable in a second direction, opposite the first direction, in response to pressurized fluid supplied to second chamber 38. Specifically, pressurized fluid selectively supplied to first and second chambers 36, 38 may selectively extend and retract actuator 18 to affect movement of implement 14. As such, the amount of movement of implement 14 may be a function of the amount and/or pressure of the pressurized fluid supplied to first and second chambers 36, 38. It is contemplated that actuator 20 may be substantially similar to actuator 18 and, as such, is not described in further detail. It is also contemplated that either or both of actuators 18, 20 may, alternatively, include a hydraulic motor having first and second chambers therein and providing a rotary mechanical output as a function of pressurized fluid being selectively supplied to first and second cambers 36, 38.

Source 24 may be configured to produce a flow of pressurized fluid and may include a variable displacement pump and/or other sources of pressurized fluid known in the art. Source 24 may be drivably connected to a power source by, for example, a countershaft, a belt, an electrical circuit, or in any other suitable manner. Source 24 may be disposed downstream of low pressure source 26 and may supply pressurized fluid to directional valves 28 and pressure valve 30. It is contemplated that source 24 may, alternatively, include a plurality of pumps configured as stage pumps as is conventional in the art. It is also contemplated that source 24 may be adjustable to selectively supply pressurized fluid at different pressures and different flow rates as a function of adjusting one or more parameters, e.g., a swashplate angle of a swashplate type pump, on source 24 as is know in the art. It is further contemplated that source 24 may have a minimum displacement and pressure setting conventionally referred to as standby pressure. As such, source 24 may substantially continually supply pressurized fluid to downstream components of hydraulic system 22.

Low pressure source 26 may include, for example, a reservoir or a tank, configured to hold a supply of fluid. The fluid may include, for example, a dedicated hydraulic oil, an engine lubrication oil, a transmission lubrication oil, or any other fluid known in the art. One or more hydraulic systems within vehicle 10 may draw fluid from and return fluid to low pressure source 26. It is contemplated that hydraulic system 22 may be connected to multiple separate low pressure sources.

Directional valves 28 may include first and second valves 28a, 28b, each respectively associated with actuators 18, 20 to regulate a flow of pressurized fluid to a respective one of actuators 18, 20. Specifically, each of directional valves 28 may include a proportional valve element that may be spring biased and solenoid actuated to move the valve element toward any of a plurality of positions. Further description of directional valves 28 is made with reference to first valve 28a for clarification purposes only, and it is noted that the description thereof is applicable to second valve 28b. It is contemplated that directional valves 28 may include any number of valves.

For example, the valve element of first valve 28a may be movable from a first position in which a flow of pressurized fluid may be substantially blocked from flowing toward first and second chambers 36, 38. The valve element may also be movable from the first position toward a second position, in which a maximum flow of pressurized fluid may be allowed to flow from source 24 toward first chamber 36 and a maximum flow of pressurized fluid may be allowed to flow from second chamber 38 toward low pressure source 26. The valve element may further be movable from the first position toward a third position, in which a maximum flow of pressurized fluid may be allowed to flow from source 24 toward second chamber 38 and a maximum flow of pressurized fluid may be allowed to flow from first chamber 36 toward low pressure source 26. It is contemplated that first valve 28a may alternately be hydraulically actuated, mechanically actuated, pneumatically actuated, or actuated in any other suitable manner. It is also contemplated that first valve 28a may include a plurality of independent metering valves, a fixed flow area valve, and/or any other valve arrangement known in the art. It is noted that the amount pressurized fluid directed toward actuator 18 may be a function of the position of first valve 28a and, thus, movement of implement 14 may be a function of the amount of actuation of the valve element of first valve 28a and, correspondingly, the amount of flow area through which pressurized fluid is allowed to flow.

First valve 28a may further include an orifice configured to direct pressurized fluid from source 24 toward pressure valve 30 when first valve 28a is in the first position. The orifice may be any communication passage configured to fluidly communicate source 24 with pressure valve 30 and allow the flow of pressurized fluid from source 24 toward pressure valve 30. For example, the orifice may be disposed within the valve element of first valve 28a. It is contemplated that movement of the valve element of the first valve 28a from the first position toward either the second or third positions may substantially block the flow of pressurized fluid from source 24 toward pressure valve 30 through the orifice. It is also contemplated that the orifice may, alternatively, be disposed within a housing of first valve 28a in which the valve element reciprocates and that movement of the valve element may not substantially block the flow of pressurized fluid from source 24 toward pressure valve 30. Further explanation of the orifice being disposed within the housing will be described below with reference to FIG. 3.

Pressure valve 30 may include a proportional valve element that may be spring biased and solenoid actuated to move the valve element among a plurality of positions between a substantially flow blocking position and a fully opened position. Specifically, pressure valve 30 may selectively communicate pressurized fluid from the respective orifices of each of directional valves 28 toward low pressure source 26. It is contemplated that the amount of fluid directed toward low pressure source 26 may be a function of the position of pressure valve 30 and, thus, the corresponding amount of flow area thereof.

Figure 3:
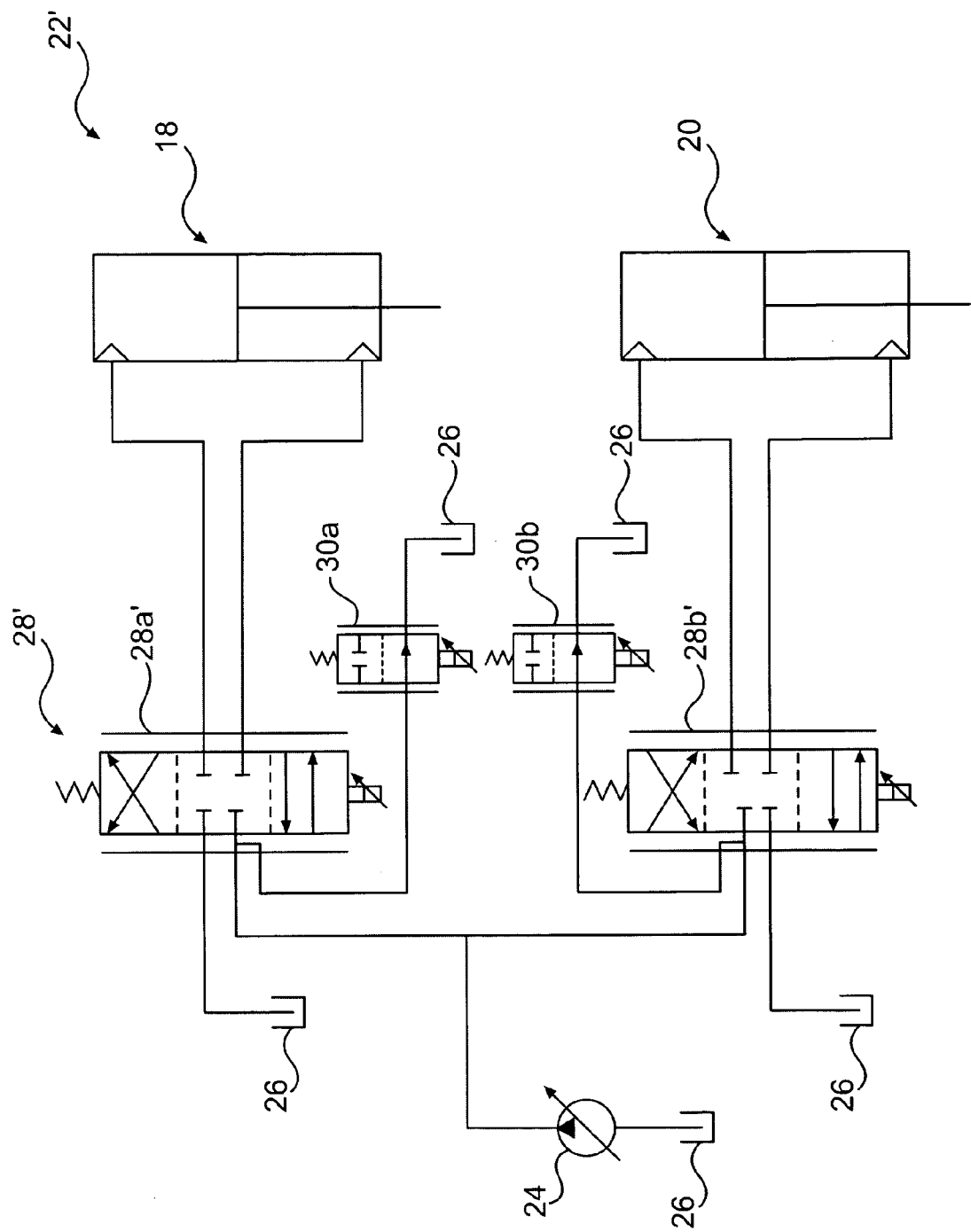
FIG. 3 is a schematic illustration of an exemplary hydraulic system of the machine of FIG. 1.

FIG. 3 illustrates another exemplary hydraulic system 22'. Hydraulic system 22' is substantially similar to hydraulic system 22 and, as such, only the differences will be described below. Hydraulic system 22' may include first and second directional valves 28a', 28b' and may also include first and second pressure valves 30a, 30b, respectively associated with first and second directional valves 28a', 28b'. First and second directional valves 28a', 28b' may each be substantially similar to first and second directional valves 28a, 28b of hydraulic system 22 (see FIG. 2), however, the orifices configured to fluidly communicate source 24 with first and second pressure valves 30a, 30b may be disposed within the housing thereof. Each of first and second pressure valves 30a, 30b may be substantially similar to pressure valve 30 described above with reference to hydraulic system 22 (see FIG. 2) and may respectively direct pressurized fluid from an associated one of first and second directional valves 28a', 28b' toward low pressure source 26. It is contemplated that the orifices within first and second directional valves 28a', 28b' may be any communication passageway known in the art and may not be blocked when first and second directional valves 28a', 28b' are respectively in second or third positions. It is also contemplated that any combination of directional valves 28 of hydraulic system 22 and/or directional valves 28' of hydraulic system 22' may include an orifice disposed within a valve housing or disposed within a respective valve element. It is further contemplated that hydraulic system 22' may include any number of directional valves 28' and may include any number of pressure valves, e.g., pressure valves 30a, 30b, each respectively associated with one of directional valves 28'.

INDUSTRIAL APPLICABILITY

The disclosed hydraulic system may be applicable to control and vary the standby pressure thereof. The disclosed hydraulic system may reduce energy loss and the affects that pressure spikes may have on one or more control valves and may increase actuator response time. The operation of hydraulic system 10 is explained below.

Initially, hydraulic system 22 may be at idle when no movement of actuators 18, 20 is desired and, as such, source 24 may be controlled to its minimum displacement and pressure output, i.e., controlled to its standby displacement and pressure, and directional valves 28 may both be controlled to their respective first position substantially blocking flow of pressurized fluid toward actuators 18, 20, respectively. The orifices of directional valves 28 may fluidly communicate the standby flow from source 24 toward pressure valve 30 and pressure valve 30 may direct a portion of the standby flow from source 24 toward low pressure source 26.

Depending upon the position of pressure valve 30 and thus the amount of flow area thereof, the standby pressure may be varied. For example, if pressure valve 30 is in a fully opened position, a maximum amount of pressurized fluid may be directed from source 24 toward low pressure source 26 and, as a result, a minimum standby pressure may be established. Conversely, if pressure valve 30 is in a substantially flow blocking position, substantially no pressurized fluid will be directed from source 24 toward low pressure source 26 and, as a result, a maximum standby pressure may be established. Additionally, each of the plurality of positions of pressure valve 30 between the fully opened position and the substantially flow blocking position may establish a variable amount of pressurized fluid being directed toward low pressure source 26 correspondingly establishing variable standby pressures between the maximum and minimum standby pressures. It is contemplated that the maximum and minimum standby pressures, as well as the degree of variability therebetween, may be a function of one or more parameters of source 24, pressure valve 30, the orifices of directional valves 28, and/or other parameters of hydraulic system 22 and/or components thereof as is known in the art. It is also noted that the physical relationship between the standby pressure may be a function of the pressure drop established across pressure valve 30 and the minimum displacement of source 24 is well known in the art and, as such, is not further described.

Subsequently, movement of either one or both of actuators 18, 20 may be desired and, as such, source 24 may be controlled from the standby pressure to a non-minimum displacement and pressure output. Additionally, one or both of directional valves 28 may be controlled to either of the respective second or third positions to direct pressurized fluid to and from actuators 18, 20. Substantially simultaneously, pressure valve 30 may be controlled to its substantially flow blocking position to substantially cease to direct pressurized fluid toward source 26. As hydraulic system 22 returns to idle and/or when either of directional valves 28 may be positioned in the respective first positions, source 24 may again be controlled to the standby displacement and pressure and pressure valve 30 may be controlled to a flow passing position. It is contemplated the when either of directional valves 28 may be controlled to either of their respective second or third positions, pressure valve 30 may be substantially simultaneously controlled to its flow blocking position. As such, regardless of the location of the orifices in and/or the number of directional valves 28 not in a first position, pressurized fluid may not be directed toward low pressure source 26 instead of being directed toward actuators 18, 20.

It is contemplated that pressure valve 30 may dynamically be controlled to any of the plurality of flow passing positions during the operation of hydraulic system 22. For example, when each of directional valves 28 return to their respective first positions, pressure valve 30 may allow a flow of pressurized fluid toward low pressure source 26 that is greater or less than the flow of pressurized fluid allowed toward low pressure source 26 with respect to a previous time each of direction valves 28 were in their respective first positions. As such, the standby pressure of source 24 may be dynamically controlled as a function of the position of pressure valve 30 and may be a function of any system parameters, such as, for example, the number of directional valves 28 being controlled, the last desired pressure output from source 24, the number and/or type of actuators 18,20 being actuated, and/or any other desired relationship.

The operation of directional valves 28' and first and second pressure valves 30a, 30b of hydraulic system 22' may be substantially similar to the operation of directional valves 28 and pressure valve 30 of hydraulic system 22. Each of first and second pressure valves 30a, 30b may be controlled to their respective substantially flow blocking position when any of directional valves 28' may be controlled to either of the respective second or third positions.

Because the standby pressure may be a function of the position of pressure valve 30, the standby pressure may be dynamically variable. Additionally, a variable standby pressure may increase the response time of hydraulic system 22 in affecting movement of actuators 18, 20 by reducing the time necessary for source 24 to transition from the standby pressure and to the pressure desired to be communicated toward actuators 18, 20. Additionally, because pressure valve 30 may be disposed downstream of directional valves 28, pressure spikes transmitted through hydraulic system 22 by actuators 18, 20, may not be transmitted to directional valves 28 and may increase the cycle life thereof.

It will be apparent to those skilled in the art that various modifications and variations can be made to the disclosed hydraulic system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A method of operating a hydraulic system comprising:
   directing pressurized fluid from a source toward a plurality of first valves,
   each first valve having a housing and a spool reciprocating within the housing defining at least first and second valve positions;
   directing pressurized fluid from each of the plurality of first valves toward a plurality of second valves, each second valve being operatively associated with one of the plurality of first valves, when each of the plurality of first valves is in a first valve position, the plurality of second valves each having a variable flow area controllable from a substantially closed position to a fully opened position;
   directing pressurized fluid from the at least one second valve toward a source of low pressure as a function of the variable flow area;
   directing pressurized fluid from one of the plurality of first valves to an operatively associated actuator when one of the plurality of first valves is in a second valve position; and
   closing each of the plurality of second valves in response to one of the plurality of first valves moving to a second position.

2. The method of claim 1, further including:
   establishing the pressurized fluid via a variable displacement pump having a minimum displacement greater than zero; and
   affecting the pressure of the pressurized fluid when the variable displacement pump is operating at the minimum displacement as a function of the variable flow area of at least one of the plurality of second valves.

3. The method of claim 1, further including:
   directing pressurized fluid through at least one of the plurality of first valves toward at least one of the plurality of second valves via a passageway disposed within the spool of one of the plurality of first valves.

4. The method of claim 1, further including:
   directing pressurized fluid through at least one of the plurality of first valves toward at least one of the plurality of second valves via a passageway disposed within the housing of one of the plurality of first valves.

5. The method of claim 1, further including:
   opening a third valve, the third valve being one of the plurality of second valves, in response to one of the plurality of first valves moving from the second position and each of the plurality of first valves are in the first position;
   wherein the flow area of the third valve before it was closed is different than the flow area of the third valve when it was opened.

6. A machine comprising:
   at least one implement;
   a source of pressurized fluid configured to supply pressurized fluid to a plurality of first valves in parallel;
   a source of low pressure;
   a plurality of actuators disposed downstream of the plurality of first valves and operatively associated with the at least one implement, the plurality of first valves configured to selectively communicate the source of pressurized fluid and the source of low pressure with the plurality of actuators; and
   a plurality of second valves, each of the plurality of second valves operatively associated with one of the plurality of first valves, the plurality of second valves being disposed downstream of the plurality of first valves and configured to be dynamically controlled to maintain a desired standby pressure for use by the plurality of actuators.

7. The machine of claim 6, wherein:
   the source of pressurized fluid is configured to variably establish a flow of pressurized fluid toward the plurality of first valves and has a minimum displacement flow; and
   at least one of the plurality of second valves includes a proportional flow area configured to affect a pressure of the minimum displacement flow as a function of the proportional flow area.

8. The machine of claim 6, further including a plurality of first passageways each one thereof disposed within a respective one of the plurality of first valves, each of the plurality of first passageways fluidly connecting a second passageway with a third passageway;
   wherein the plurality of first valves are connected in parallel to the second and third passageways and the source of pressurized fluid is configured to direct pressurized fluid toward the second passageway and at least one of the plurality of second valves is configured to selectively communicate pressurized fluid from the third passageway toward the source of low pressure.

9. The machine of claim 6, wherein at least one of the plurality of second valves is configured to dynamically adjust the pressure of pressurized fluid directed from the source of pressurized fluid toward the source of low pressure via the at least one second valve as a function of the its flow area.

10. The machine of claim 6, further including a controller configured to affect movement of at least one of the plurality of second valves toward a substantially flow blocking position when one of the plurality of first valves selectively communicates one of the plurality of actuators with either the source of pressurized fluid or the source of low pressure.

11. The machine of claim 6, wherein:
   at least one of the plurality of first valves is a three position valve having two flow passing positions each configured to fluidly communicate one of the plurality of actuators with the source of pressurized fluid and the source of low pressure and one neutral position configured to substantially block fluid communication of the one of the plurality of actuators with the source of pressurized fluid and the source of low pressure;
   and at least one of the plurality of second valves is a proportional two position valve having a substantially flow blocking position and a fully opened position.

* * * * *